Patented Aug. 2, 1949

2,477,816

UNITED STATES PATENT OFFICE 2,477,816

BENZIL-ACID DERIVATIVE AND PROCESS FOR THE MANUFACTURE THEREOF

Edouard Masset, Basel, Switzerland, assignor to Hoffmann-La Roche Inc., Nutley, N. J., a corporation of New Jersey No Drawing. Application June 5, 1948, Serial No. 31,403. In Switzerland September 5, 1947

2 Claims. (Cl. 260—490)

The present invention is concerned with a new benzilic acid derivative, viz. α-aceto-diphenyl-acetic-acid-acetylamide and a process for the manufacture thereof.

For many years it has been the object of extended scientific research to find an anti-epileptic agent which would have no somniferous effect. Since the introduction of phenyl-ethyl-barbituric acid various compounds elected from the groups of barbituric acids, hydantoines, oxazolidines and others have been suggested for the said purpose. However, such compounds either are only suitable for rather slight cases of epilepsy or the continued administration of the agent causes undesired side reactions.

It was now discovered that a new compound, namely α-acetoxy - diphenyl - acetic-acid-acetylamide, is well suited for the treatment of patients suffering from epilepsy and that the said compound possesses remarkable advantages over the known compounds.

According to the present invention the new benzilic-acid-derivative may be prepared by reacting benzilic acid amide with 2 mols of acetic-acid-anhydride in the presence of sulphuric acid.

α-Acetoxy-diphenyl-acetic - acid - acetylamide thus obtained, the structure of which may be represented by the following formula

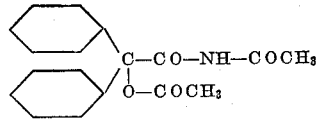

crystallises in colourless, shining needles of melting point 143° C. It is easily soluble in the usual organic solvents, insoluble in water, of neutral reaction and practically tasteless. It is intended to use the new compound as a therapeutic agent.

It could not be anticipated that it would be possible to acetylate, under relatively mild reaction conditions, benzilic-acid-amide not only at the α-hydroxy group but simultaneously at the amide group. The new compound obtained according to the invention, with its amino group carrying two acyl radicals, is distinguished by its surprising stability; thus, acetic-acid-anhydride, added in excess to the reaction mixture, may be decomposed with aqueous bicarbonate solution without effecting hydrolysation of the new diacetyl compound.

Attention has been drawn by Merrit and Putnam, Epilepsia, year 1945, volume 3, page 55, to the spasmolytic activity of benzilic-acid-amide. As compared to this compound the new α-acetoxy-diphenyl-acetic-acid-acetyl-amide possesses unexpected advantages: The toxicity of the new compound is extremely low; 5 grams per kg. bodyweight are supported by mice without causing any signs of intoxication. The therapeutic margin of safety is very high. The administration of high doses of the new, practically tasteless preparation does not entail any undesired side reactions.

Example 200 parts by weight of benzilic-acid-amide are stirred into 500 parts by weight of acetic-acid-anhydride and 5.5 parts by weight of concentrated sulfuric acid ($d=1.84$) are added during 5 minutes to the suspension. The benzilic-acid-amide is dissolved quickly and the temperature of the reaction mixture rises to about 65° C. The light yellow solution is stirred for 2 hours during which time the temperature gradually decreases. Then, the mixture is left for 15 hours at 20° C.

The solution is poured to a mixture of 1000 parts by weight of water and 500 parts by weight of crushed ice while stirring and then about 500 parts by weight of sodium bicarbonate are added in order to facilitate the decomposition of the excess acetic-acid-anhydride. At the end the solution should be weakly acid to litmus. The α-acetoxy-diphenyl-acetic-acid-acetylamide precipitates in form of crystals. It is separated and recrystallised from methanol, benzol, isopropyl-alcohol or dilute acetic acid.

I claim:

1. Process for the manufacture of a benzilic-acid-derivative, comprising reacting benzilic-acid-amide with 2 mols of acetic-acid-anhydride in the presence of sulphuric acid.

2. The compound α-acetoxy-diphenyl-acetic-acid-acetylamide.

EDOUARD MASSET.

No references cited.